(12) United States Patent
Voorhees et al.

(10) Patent No.: US 8,943,234 B1
(45) Date of Patent: Jan. 27, 2015

(54) MULTI-PROTOCOL STORAGE CONTROLLER

(71) Applicant: LSI Corporation, San Jose, CA (US)

(72) Inventors: William W. Voorhees, Colorado Springs, CO (US); William K. Petty, Colorado Springs, CO (US); Eugene Saghi, Colorado Springs, CO (US)

(73) Assignee: LSI Corporation, Milpitas, CA (US)

( * ) Notice: Subject to any disclaimer, the term of this patent is extended or adjusted under 35 U.S.C. 154(b) by 0 days.

(21) Appl. No.: 13/964,670

(22) Filed: Aug. 12, 2013

Related U.S. Application Data

(60) Provisional application No. 61/862,361, filed on Aug. 5, 2013.

(51) Int. Cl.
*G06F 3/00* (2006.01)
*G06F 3/06* (2006.01)

(52) U.S. Cl.
CPC ............ *G06F 3/0653* (2013.01); *G06F 3/0604* (2013.01); *G06F 3/0671* (2013.01)
USPC .......................................................... 710/17

(58) Field of Classification Search
None
See application file for complete search history.

(56) References Cited

U.S. PATENT DOCUMENTS

| 7,917,682 | B2 | 3/2011 | Bakthavathsalam |
| 8,447,892 | B1 | 5/2013 | Felton et al. |
| 2005/0015532 | A1 | 1/2005 | Beckett et al. |
| 2005/0138191 | A1* | 6/2005 | Seto et al. ...................... 709/230 |
| 2007/0226360 | A1* | 9/2007 | Gupta et al. ................... 709/230 |
| 2012/0166701 | A1 | 6/2012 | Oh et al. |
| 2013/0232376 | A1* | 9/2013 | Cudak et al. ...................... 710/5 |

* cited by examiner

*Primary Examiner* — Idriss N Alrobaye
*Assistant Examiner* — Dayton Lewis-Taylor
(74) *Attorney, Agent, or Firm* — Duft Bornsen & Fettig LLP; Gregory T. Fettig

(57) ABSTRACT

Systems and methods presented herein provide for coupling a storage controller to a plurality of different storage device types. One embodiment of the storage controller includes an interface operable to communicatively couple to a storage device. The storage controller also includes a processor operable to select between hardware protocol detection of the storage device and firmware protocol detection of the storage device, and to detect a protocol of the storage device when the storage device communicatively couples to the interface according to the selected protocol detection. The storage controller then selects a protocol to process input/output requests from a host based on the detected protocol of the storage device.

19 Claims, 7 Drawing Sheets

MULTI-PROTOCOL STORAGE CONTROLLER

CROSS REFERENCE TO RELATED APPLICATIONS

This document claims priority to and thus the benefit of an earlier filing date from U.S. Provisional Patent Application No. 61/862,361 (filed on Aug. 5, 2013, entitled "Multi-Protocol Storage Controller"), which is hereby incorporated by reference.

FIELD OF THE INVENTION

The invention generally relates to field of storage controllers.

BACKGROUND

Numerous storage device interfaces exist and continually challenge storage domains. For example, Peripheral Component Interconnect Express protocol (PCIe) based storage devices are now being used in association with Serial Attached Small Computer System Interface (SAS) storage domains. And, in some instances, PCIe storage devices are "hot-swapped" in place of SAS storage devices. But, PCIe is a packet based, connectionless transfer protocol and SAS is an end-to-end, connection based protocol that does not provide for connectionless transfers, making interoperability particularly challenging. More particularly though, storage controllers employing one protocol are incapable of detecting storage devices of another protocol when hot swapped into the domain.

SUMMARY

Systems and methods presented herein provide for coupling a storage controller to a plurality of different storage device types. In one embodiment, a storage controller includes an interface operable to communicatively couple to a storage device. The storage controller also includes a processor operable to select between hardware protocol detection of the storage device and firmware protocol detection of the storage device, and to detect a protocol of the storage device when the storage device communicatively couples to the interface according to the selected protocol detection. The storage controller then selects a protocol to process input/output requests from a host based on the detected protocol of the storage device.

The various embodiments disclosed herein may be implemented in a variety of ways as a matter of design choice. For example, the embodiments may take the form of computer hardware, software, firmware, or combinations thereof. Other exemplary embodiments are described below.

BRIEF DESCRIPTION OF THE FIGURES

Some embodiments of the present invention are now described, by way of example only, and with reference to the accompanying drawings. The same reference number represents the same element or the same type of element on all drawings.

DETAILED DESCRIPTION OF THE FIGURES

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention and are to be construed as being without limitation to such specifically recited examples and conditions. As a result, the invention is not limited to the specific embodiments or examples described below.

Figure 1:
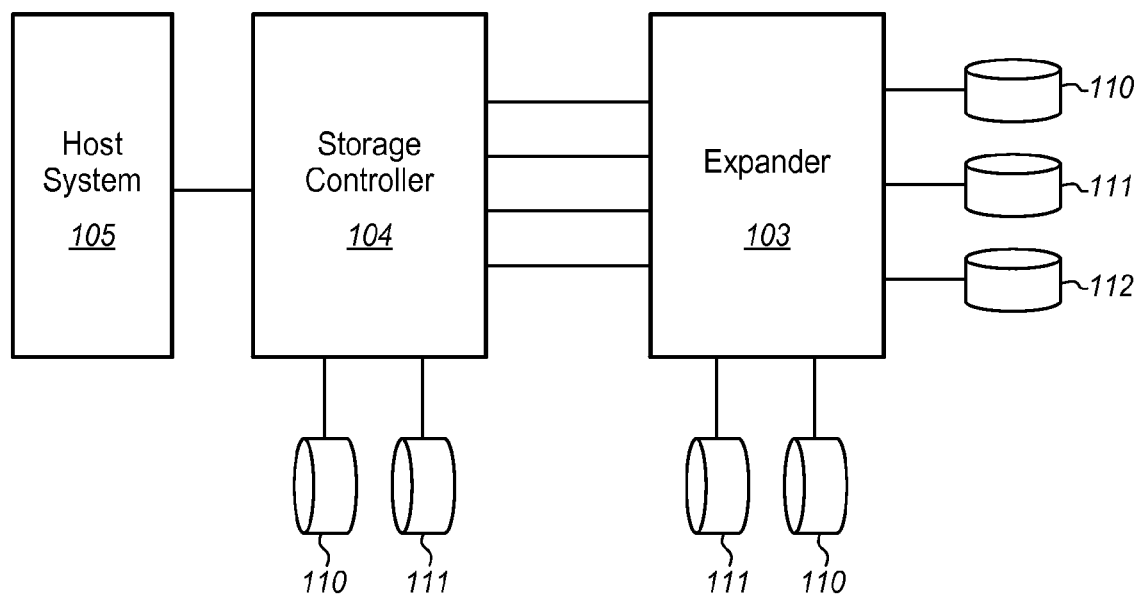
FIG. 1 is a block diagram of an exemplary storage controller operable with devices of differing protocols.

FIG. 1 is a block diagram of an exemplary storage controller 104 operable with devices of differing protocols. The storage controller 104 is operable to process I/O requests of a host system 105 and direct those I/O requests to various target devices 110, 111, and 112 according to their respective storage protocols. For example, in this embodiment, the target devices 110 are SAS storage devices, the target devices 111 are PCIe storage devices, and the target device 112 is a storage device using some other protocol (e.g., a Serial Attached AT Attachment (SATA) protocol, a Fibre Channel over Internet Protocol protocol, an Enterprise Systems Connection, a Fibre Channel protocol, a Universal Serial Bus (USB) protocol, an Internet Serial Attached Small Computer System Interface (ISCSI) protocol, etc.). The storage controller 104 is operable to discover, via hardware and/or firmware, the type of storage device it connects to when one of the target devices 110, 111, 112 is coupled to the storage controller 104. Once discovered, the storage controller 104 can process I/O requests from the host system 105 to any of the target devices 110, 111, 112 via their respective storage protocols.

The target devices 110, 111, 112 may be directly attached the storage controller 104 or they may be coupled through a storage system expansion component, such as the expander 103. For example, one or more expanders may be operable to directly attach to other target devices 110, 111, 112 as well as other expanders to provide a "switched fabric" that switches I/O request to appropriate devices as determined by the storage controller 104. An example of the expander 103 includes a wide port expander operable with multiple protocols, such as those mentioned (e.g., SAS, PCIe, USB, SATA, etc.).

Examples of the target devices 110, 111, 112 include storage devices, such as disk drives and solid state drives (SSDs). In this regard, the target devices 110, 111, 112 may provide data storage on behalf of the host system 105. And, the host system 105 may configure read/write requests for input/output (I/O) operations with any of the target devices 110, 111, 112. The host system 105 may be any suitable computing device or system operable to perform I/O operations, for example, servers, workstations, personal computers, etc.

The storage controller 104 is any device, system, software, or combination thereof operable to perform device discovery, manage I/O requests to the target devices 110, 111, 112, and process I/O commands directed to data thereof. For example, the storage controller 104 may be implemented as custom circuitry, as a special or general purpose processor executing programmed instructions stored in an associated program memory, or some combination thereof. The storage controller 104 may be an independent SAS device, a Host Bus Adapter (HBA) of a host, or an integrated component of the host system 105.

The storage controller 104 includes a frontend interface adapted to couple to and receive I/O requests of the host system 105. The storage controller 104 also includes a backend interface (shown and described in greater detail below) that is adapted to couple to and support PCIe devices (e.g., PCIe compatible expanders, PCIe switches, and PCIe target devices 111), SAS devices (e.g., SAS target devices 110 and SAS expanders), and others.

The expander 103 is any device, system, software, or combination thereof operable to expand a storage system via possible connections to multiple storage devices. In this regard, the expander 103 may connect to SAS components, such as SAS target devices 110 and other expanders via a plurality of physical transceivers, or "Phys". More particularly, the expander 103 may be operable to directly attach to a plurality of target devices via a number of different protocols, such as those mentioned (e.g., SAS, PCIe, USB, SATA, etc.) and may utilize the protocol detection methods present in the storage controller 104.

Although shown and described with respect to a certain number of expanders and target devices, the invention is not intended to be limited to any particular number of components or their illustrated connections. Certain operational details of the storage controller 104 are now discussed with respect to the flowchart of FIG. 2.

Figure 2:
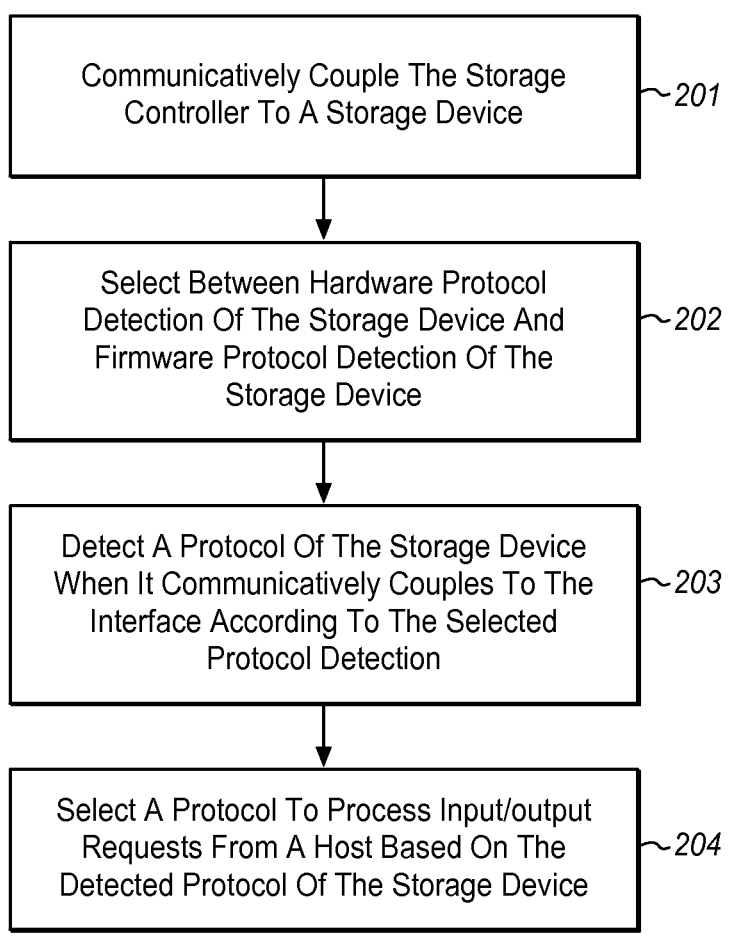
FIG. 2 is a flowchart of an exemplary process of the storage controller of FIG. 1.

FIG. 2 is a flowchart of an exemplary process 200 operable with the storage controller 104 of FIG. 1. The process 200 initiates when the storage controller 104 communicatively couples to a storage device, in the process element 201. For example, when one of the target devices 110, 111, or 112 couples to the storage controller 104, either directly or indirectly (e.g., via the expander 103), the storage controller 104 begins a hardware discovery and/or a firmware discovery of the target device. In this regard, the storage controller 104 selects between a hardware protocol detection of the storage device and a firmware protocol detection of the storage device, in the process element 202.

Once the detection scheme is selected, the storage controller automatically begins detecting the protocol of the storage device, in the process element 203. For example, a hardware detection scheme may be employed by the storage controller 104 to determine the protocol of the storage device when it couples to an interface of the storage controller via hardware signaling and/or time domain reflectometry. If the storage device is not detected via the hardware protocol detection scheme, the storage controller 104 may fail over to a firmware detection scheme by attempting link establishment via various protocols until the storage device responds. The storage controller 104 may, however, also be configured to initiate from a firmware protocol detection scheme and failover to a hardware protocol detection scheme or even be configured to only use one or the other detection schemes to detect the protocol of the attached storage device.

Once the protocol of the storage device is detected, the storage controller 104 selects a protocol to process I/O requests from the host system 105, in the process element 204. For example, the storage controller 104 may be configured with a variety of protocol stacks. Once the protocol of the storage device is detected, the storage controller 104 processes the I/O requests from the host system 105 through the appropriate protocol stack.

Figure 3:
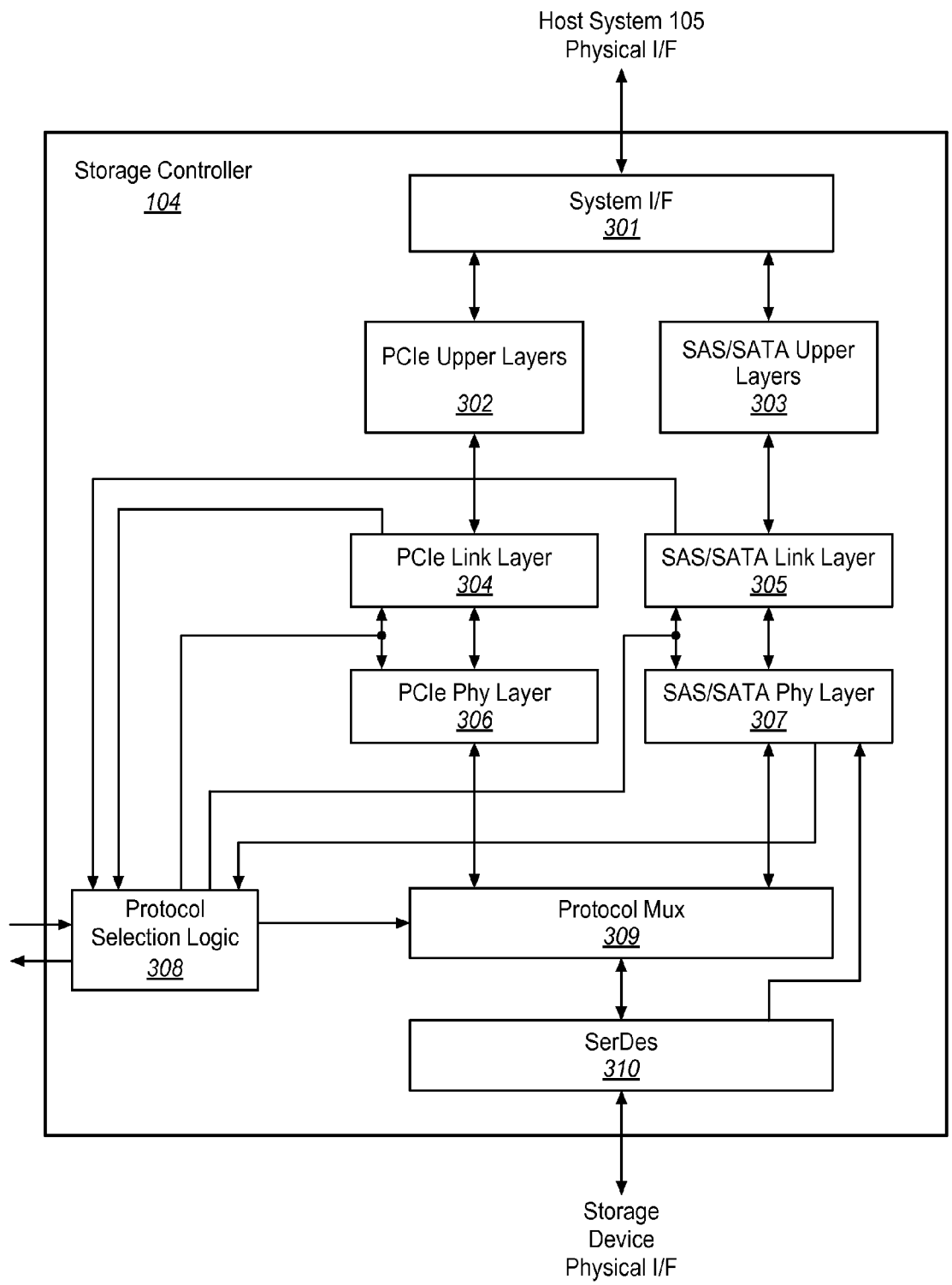
FIG. 3 is a block diagram of another exemplary storage controller.

FIG. 3 is a block diagram of another exemplary storage controller 104. In this embodiment, the storage controller 104 is configured with a system interface 301 that is operable to communicatively and physically couple the storage controller 104 to the physical interface of the host system 105 and process I/O requests according to PCIe and SAS/SATA protocol stacks. The PCIe stack comprises PCIe upper layers 302, a PCIe link layer 304, and a PCIe physical layer 306, or Phy. The SAS/SATA stack comprises SAS/SATA upper layers 303, a SAS/SATA link layer 305, and a SAS/SATA physical layer 307, or Phy.

The storage controller 104 also comprises protocol selection logic 308 that is operable to select the appropriate protocol stack when the protocol of the storage device is detected. A protocol multiplexer 309 is communicatively coupled to the protocol selection logic 308 to control which of the protocol stacks will be used when the protocol the storage device is detected.

The protocol selection logic 308 and associated protocol multiplexer 309 work in conjunction to choose whether the storage device's physical interface connects to the PCIe protocol stack or the SAS/SATA protocol stack. The serial/deserializer (SerDes) 310 is operable to perform a hardware protocol detection of the attached storage device. Indication of successful link establishment is passed from both the PCIe link layer 304 and the SAS/SATA link layer 307 to ensure that the protocol multiplexer 309 remains fixed on a currently selected protocol when success is achieved. In some embodiments, a particular protocol's link and Phy layers (e.g., PCIe link layer 304, PCIe Phy layer 306, SAS/SATA link layer 305, SAS/SATA Phy layer 307) are enabled when the protocol multiplexer 309 is currently selecting that protocol so as to minimize power consumption. For example, power can be reduced by quiescing an unused protocol stack of the storage controller 104 and turning off a clock in the storage controller 104. This prevents MOS gates from toggling, which can contribute to a significant waster of power in semiconductors due to switching of the capacitive loads of the gates.

In another embodiment, a loss of signal indication from the SerDes 310 is used directly by the SAS/SATA Phy layer 307 even when the protocol multiplexer 309 is currently selecting PCIe protocol to allow a rapid switch over to SAS/SATA protocol in the event that valid SAS/SATA Out Of Band (OOB) signals are detected. For example, the protocol multiplexer 309 may be directed by the protocol selection logic 308 to select the PCIe protocol stack for communication with the attached storage device. However, the attached storage device may be a SAS/SATA storage device. The storage controller 104 may be operable to more quickly hardware detect the OOB signals of the SAS/SATA device while the PCIe protocol stack is attempting to communicate with the attached storage device. In this regard, the detection of OOB signals may actually take place in the SAS/SATA Phy layer 307. The SerDes 310 provides loss of signal indication to the SAS/SATA Phy layer 307 which, in turn, looks for a proper OOB pattern. The protocol selection logic 308 then selects the SAS/SATA protocol stack and ceases attempts by the PCIe protocol stack to communicate with the attached storage device.

The automatic OOB detection process can be provided in parallel to the detection of progress on the PCIe link layer 304. In the event that PCIe is not making progress and a valid SAS/SATA OOB signal is received by the SerDes 310, the protocol multiplexer 309 switches over to SAS/SATA control (i.e., the SAS/SATA protocol stack) such that an OOB signal may be sent in reply to the attached storage device. Even if no PCIe or SAS/SATA activity is present, the protocol multiplexer 309 may periodically switch to the SAS/SATA protocol stack to send an OOB signal to comply with the Hotplug timeout requirements of the T10 SAS standards (T10 is the technical committee that establishes the standards for SCSI, SATA, and SAS). An example of this detection is shown and described in the flowchart of FIG. 6.

In any case, an indication of a successful link being established may be passed from the PCIe link layer 304 to the SAS/SATA link layer 305 via the protocol selection logic 308, and vice versa, such that the protocol selection logic 308 halts any further attempts to switch protocols (e.g., by alerting the firmware of the storage controller 104 to the successful result via an interrupt or some other means).

Figure 4:
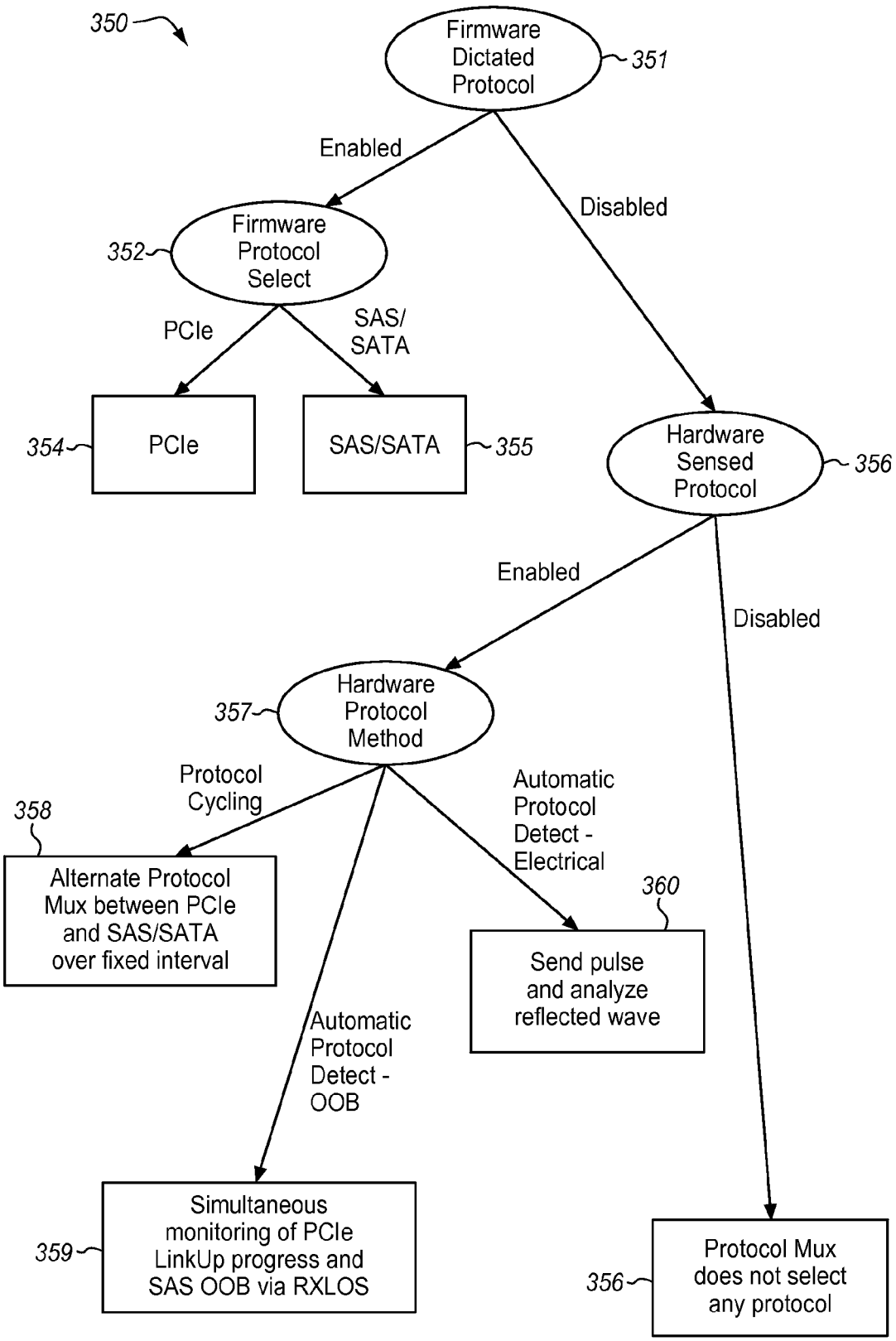
FIG. 4 is a flowchart of an exemplary process of the storage controller of FIG. 3.

The manner in which a particular protocol detection scheme is selected in the storage controller 104 may be performed in a number of ways. FIG. 4 is a flowchart of one such exemplary process of protocol detection selection by the storage controller 104. More specifically, a programmable protocol selection method is illustrated in FIG. 4 that provides the firmware of the storage controller 104 with the ability to choose the protocol based on a priori knowledge of the system configuration. For example, the storage controller 104 may enable firmware protocol detection, in the process element 351, such that firmware attempts to initiate communication with the attached storage device before or in parallel with hardware detection. The storage device being attached to the storage controller 104 may be known such that the firmware of the storage controller 104 can automatically initiate protocol detection via a predetermined firmware selection of the protocol, in the process element 352. In this regard, the firmware of the storage controller 104 may automatically choose the PCIe protocol, in the process element 354, if the device is known to be a PCIe storage device or the SAS/SATA protocol if the device is known to be a SAS/SATA storage device, in the process element 355.

Alternatively, the firmware protocol detection of the process element 352 may provide the storage controller 104 with the ability to cycle through the available protocols of the storage controller 104 until a connection is made with the attached storage device. For example, the firmware may alternate between protocols looking for a "PhyReady" SAS/SATA condition or a "LinkUp" PCIe condition. In either case, the firmware of the storage controller 104 chooses either PCIe or SAS/SATA operation, and the protocol multiplexer 309 is set to the appropriate protocol until the firmware of the storage controller 104 changes the configuration.

If the firmware protocol detection of the process element 351 is disabled, the storage controller 104 would generally implement a hardware protocol detection in the process element 356. The hardware sensed protocol detection of the process element 356 mode may be enabled if the storage controller 104 firmware has no knowledge of the protocol to expect and decides to not cycle between the protocols. Once the hardware sensed protocol detection successfully achieves a PhyReady or LinkUp state with a particular protocol, any further protocol switching is suspended until it is enabled again by firmware. If the hardware sensed protocol detection of the process element 356 is disabled, the protocol multiplexer 309 may be held in an idle position such that no protocol stack is selected. For example, both the PCIe and SAS protocol stacks of the storage controller 104 in this respect would remain quiescent.

If the hardware sensed protocol detection of the process element 356 is enabled, the storage controller 104 may be configured to cycle through protocol stacks (process element 358), automatically detect the protocol of the OOB signals (process element 359), and/or transmit a pulse and analyze the reflected wave via time domain reflectometry, or "TDR", (process element 360). To illustrate, the protocol multiplexer 309 may alternate between PCIe and SAS/SATA protocol stacks with a programmable dwell time for each protocol until success for any protocol is achieved, in the process element 358. After a successful connection via a particular protocol is established, an interrupt directs the storage controller 104 to begin processing I/O requests according to the protocol of the storage device. Generally, all channels associated with a x2, x4, x8, or x16 PCIe configuration should alternate simultaneously, and the PCIe Link Layer 304 automatically detects a lane reversal condition during the training sequence such that there is no need to cycle through different lane reversal configurations.

In the process element 359, the protocol multiplexer 309 may be configured to default to the PCIe Phy layer 306, but a loss of signal indication, such as an RXLOS signal, would still be transferred to the SAS/SATA Phy layer 307 to support OOB sequence detection. Then, if the storage controller 104 is able to successfully establish a link via the PCIe protocol (e.g., "LinkUp"), the protocol multiplexer 309 locks into the PCIe protocol stack of the storage controller 104. If, however, the SAS/SATA Phy layer 307 detects a valid COMINIT OOB sequence of the SAS/SATA protocol, then the protocol multiplexer 309 switches to the SAS/SATA Phy layer 307 such that the SAS/SATA Phy layer 307 may send a COMINIT to the attached storage device. If no protocol is successful within a programmable Hotplug timeout period (typically 10-500 ms), then the storage controller 104 may automatically select the SAS/SATA Phy layer 307 by sending a COMINIT to the storage device in an attempt to "brute force" connect to the storage device. Alternatively, the storage controller 104 may simply continue monitoring or perform an alternative protocol detection scheme.

In the process element 360, the SerDes 310 periodically sends a pulse and analyzes the reflected wave to detect a distinct AC coupling characteristic which indicates the protocol of the attached device. For example, the storage device, based on its standardized storage protocol electrical requirements, has a particular analog signaling characteristic. A TDR pulse transmitted to the storage device would be reflected back to the SerDes 310 and analyzed by the storage controller 104 to determine the type of storage device that is coupled to the storage controller 104. An example of such hardware/TDR detection is shown and described below in FIG. 5.

Figure 5:
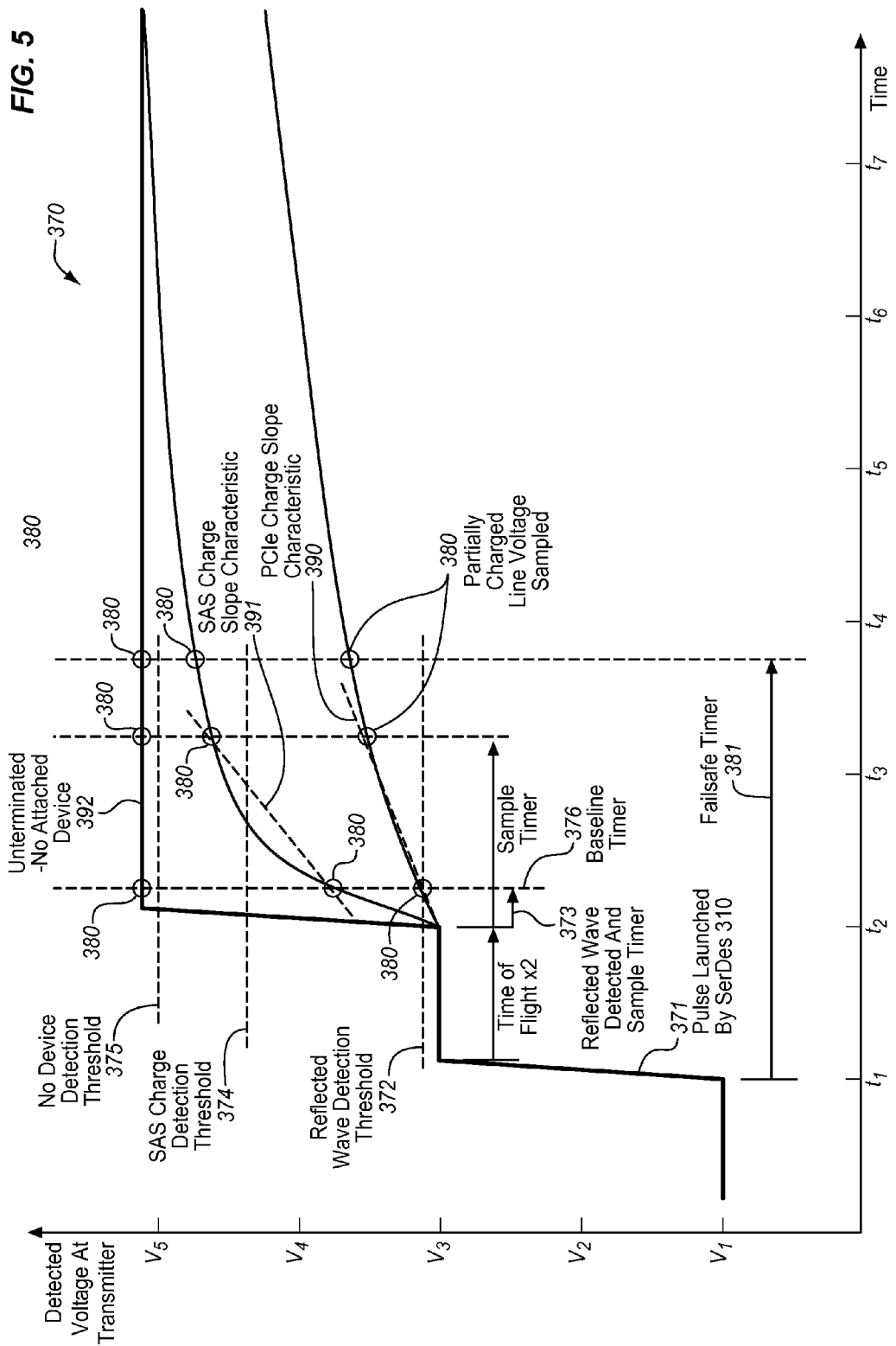
FIG. 5 is a graph of an exemplary hardware protocol detection scheme of the storage controllers of FIGS. 1 and 3.

FIG. 5 is a graph 370 of an exemplary hardware detection scheme of the storage controllers 104. One particular challenge in sensing PCIe versus SAS electrical characteristics is the broad range of passive channel lengths employed in SAS. SAS channel lengths may range from just a few centimeters to as many as 10 meters, which can induce a delay in a reflected TDR wave of many 10 s of nanoseconds (e.g., illustrated as "time of flight x2").

A sample timer (373) may be implemented by the SerDes 310 to determine when to sample the reflected wave and make an assessment of the charge characteristic. Such a timer may be configured to start when the TDR pulse is launched (i.e., the bolder line 371). Alternatively, an accurate measurement of the charge characteristic of the pulse in a SAS channel with unknown length could be obtained with a threshold (372) being used to detect the reflected TDR pulse from the SAS channel arriving back at the SerDes 310. Another alternative would include a dV/dt receiver being used to detect the arrival of the reflected TDR pulse. Once the reflected TDR pulse arrives, the sample timer would be started (373). When the sample timer expires, the voltage at the SerDes 310 can be sampled (e.g., sample points 380) and compared to various threshold voltages (e.g., 372, 374, 375). For example, if a SAS charge detection threshold is exceeded, the TDR pulse would indicate that a SAS Device is attached to the storage controller 104. Otherwise, the TDR pulse would indicate that a PCIe storage device is attached or that no devices attached at all (375). Such thresholds could be programmed into the firmware of the storage controller 104 to provide flexibility in different implementations and operating environments.

In another embodiment, a failsafe timer may be used to determine the type of storage device that is attached to the storage controller 104. For example, at a launch of TDR pulse (371), a failsafe timer set to twice the maximum cable length delay may be started. If a reflected TDR pulse is detected, the sample timer would be triggered and sampling (e.g., sample points 380) of the charge value would occur. If no reflected TDR pulse is observed, sampling of the charge value would occur when the fail safe timer expires. For example, if a link is properly terminated, then there is no reflection and the fail safe timer would start. If the link is not terminated, then the reflection triggers the detection automatically at a time based on twice the delay of the maximum length of the transmission line.

Alternatively, a baseline timer (376) could be used in conjunction with the failsafe timer to make an assessment of a charge slope (e.g., 390, 391, 392) based on sampling rather than basing the assessment purely on absolute voltage thresholds. For example, the baseline timer may be used to sample the reflected TDR pulse shortly after the TDR pulse has been received. The baseline timer may capture the first point in determining the charge slope. Thereafter, the sample timer can be used to capture the second point from which the charge slope may be determined. Multiple samples may of course be used to improve accuracy and improve noise immunity (i.e., more accurately determine what is signal and what is noise).

This reflected TDR pulse detection technique for starting the sample timer provides flexibility for channels of a variety of lengths, including those beyond the 10 meter passive length limit of SAS. Additional thresholds could also be employed to provide finer discrimination of charge characteristics associated with the various protocols. An analog-to-digital converter could be employed to perform the detection with the charge level being determined via numeric comparison. Additional accuracy could be achieved by taking multiple samples during the charge time and performing numerical analysis and curve fitting on the resultant sample points 380 prior to making a determination on the charge characteristic.

Figure 6:
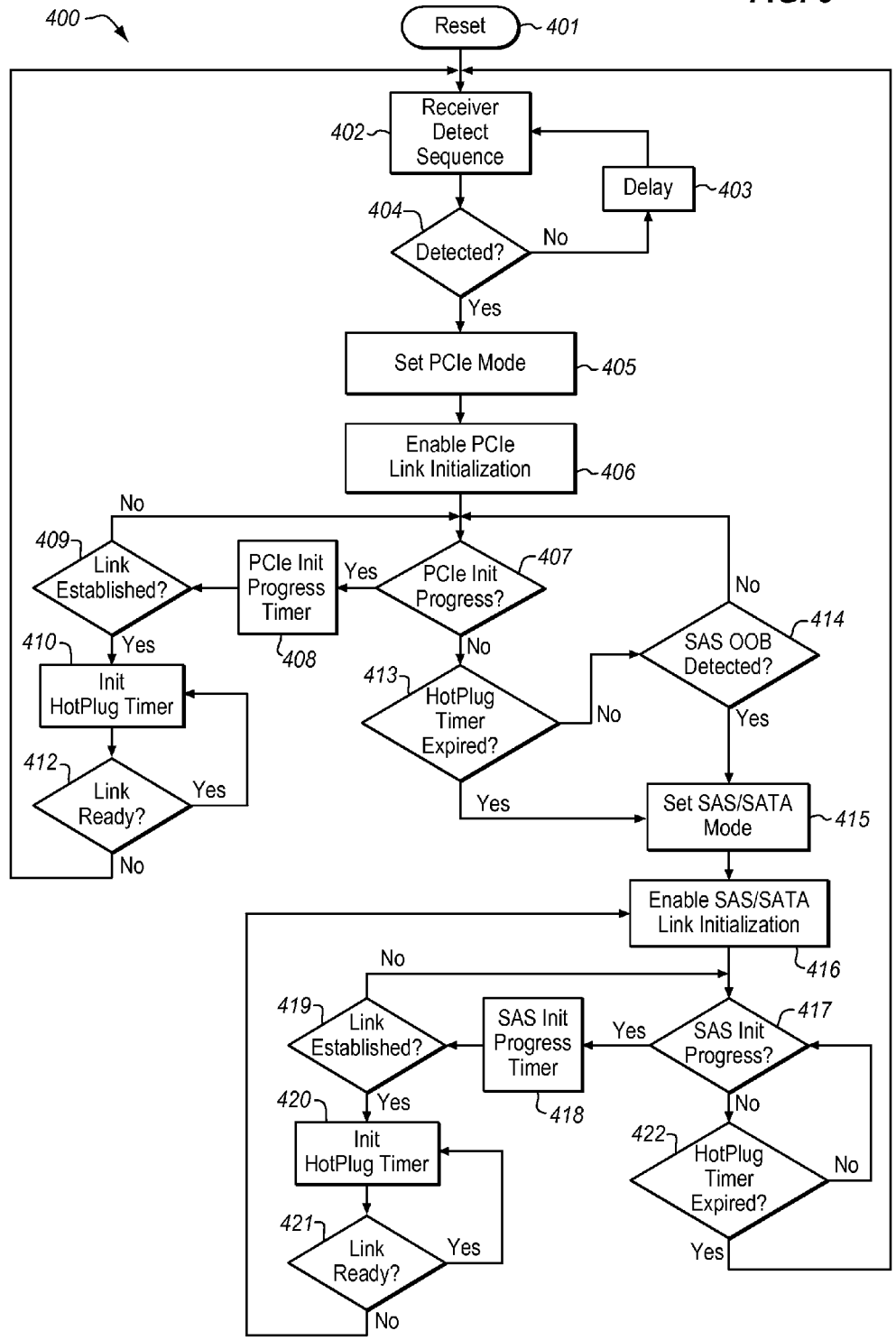
FIG. 6 is a flowchart of another exemplary process of the storage controller of FIG. 3.
Figure 7:
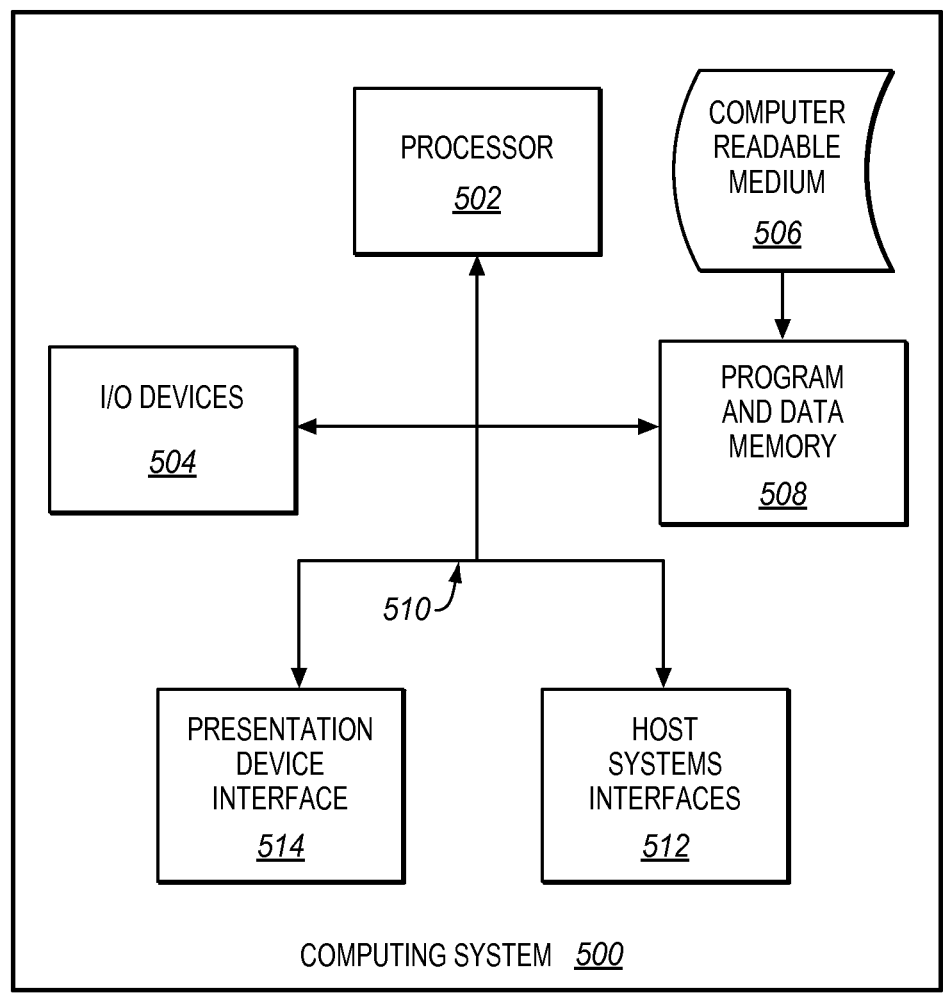
FIG. 7 is a block diagram of an exemplary computing system in which a computer readable medium provides instructions for performing methods herein.

FIG. 6 is a flowchart of another exemplary process 400 of the storage controller 104. The process 400 illustrates hysteresis in a selected protocol. In the event that a link is dropped, the storage controller 104 can attempt to reestablish the link with a most recently used protocol. Such may be useful for cases where a link is reset due to firmware-directed reinitialization when a new device is not actually installed. For example, the firmware resets the storage controller 104, in the process element 401, and connection to a storage device is then lost. The storage controller 104 may then perform a receiver detect sequence to acquire a previously attached PCIe device after initialization of the storage controller 104, in the process element 402. The storage controller 104 may perform this operation a number of times after some delay (process element 403) until the PCIe device is detected, in the process element 404. For example, the storage controller 104 may be configured to attempt detection of the attached storage device some predetermined number of times before switching to another form of protocol detection.

Once the PCIe device is detected, the storage controller selects the PCIe protocol stack to set the PCIe mode of the storage controller 104, in the process element 405. The storage controller 104 then enables the PCIe link initialization of the PCIe link layer 304, in the process element 406. Afterwards, the storage controller 104 makes a determination as to whether the PCIe initialization is making progress, in the process element 407.

If the PCIe initialization is making progress, the storage controller 104 initiates a PCIe progress timer, in the process element 408, looping through until a link is established with the PCIe device, in the process element 409. Once the link is established, the storage controller initiates a Hotplug timer to determine if the PCIe device is ready to communicate with the storage controller 104, in the process elements 410 and 412. The purpose of the loop is to allow a certain amount of time to reestablish communications with the PCIe device before trying the SAS/SATA protocol if the PCIe Link becomes not ready at any point. If the link is not ready, the storage controller 104 may attempt to establish a connection by re-initiating the receiver detect sequence of the process element 402. But, as long as a link is up, the Hotplug timer continues to be reset. If the link drops, the Hotplug timer continues running so that there is only so much time given to try and reestablish the link with that particular protocol. If the Hotplug timer eventually expires (e.g., process elements 413 and 422), then the storage controller 104 attempts communication via another protocol.

If the PCIe initialization is not making progress, the storage controller 104 determines whether the Hotplug timer initiated in the process element 410 has expired, in process element 413. If not, the SerDes 310 determines whether the SAS OOB signal has been detected, in the process element 414. If not, the storage controller 104 returns to the process element 407 to determine whether the PCIe initialization is making progress. If the Hotplug timer has expired or the SAS OOB signal has been detected, the storage controller 104 selects the SAS/SATA protocol stack to establish the SAS/SATA mode of the storage controller 104, in the process element 415. In this regard, the storage controller 104 enables SAS/SATA link initialization of the SAS/SATA link layer 305, in the process element 416, thereby making the decision to abandon PCIe initialization.

Once the link layer 305 is enabled, the storage controller 104 determines whether the SAS initialization has begun and is making progress, in the process element 417. If so, the storage controller 104 initiates a SAS initialization progress timer, in the process element 418, and determines whether the SAS/SATA link is established, in the process element 419. For example, the SAS initialization progress timer may establish a certain amount of time for the storage controller 104 to link to the storage device, assuming that it is a SAS storage device. If the link is not established within that amount of time, the storage controller 104 may return to the process element 417 to determine whether the SAS initialization is making progress or not.

If the SAS/SATA link is established with the SAS/SATA link layer 305, then the storage controller 104 initiates the Hotplug timer in the process element 420 and determines whether the link is ready in the process element 421. If the link is not ready, the storage controller 104 may return to the process element 417 to determine whether the SAS initialization is making progress. If so, the storage controller 104 may continually initialize the Hotplug timer while the link is up.

Otherwise, the storage controller 104 may determine that the link is not ready and attempt to reenable the SAS/SATA link initialization in the process element 416. If the SAS initialization is not making progress (i.e., process element 417), then the storage controller 104 determines whether the Hotplug timer has expired, in the process element 422. If not, the storage controller 104 may continue waiting for SAS initialization until the Hotplug timer expires. When the timer does indeed expire, the storage controller 104 returns to process element 402 to perform another receiver detection sequence (e.g., select another protocol stack, protocol detection scheme, quit detection altogether, etc.).

The above embodiments provide several advantages over current protocol detection schemes. For example, the above embodiments provide for dynamically or statically configuring protocol detections capable of detecting any of a variety of protocols. While two protocol stacks are illustrated, the invention is not to be limited to such. The storage controller 104 may be configured with a variety of protocol stacks that allow the storage controller to couple to and communicate with a variety target devices. The protocol detection schemes include cycling through protocols performing parallel protocol detection of OOB signaling of the SAS protocol, and passive protocol detection via hardware sensing electrical characteristics of the attached devices.

The invention can take the form of an entirely hardware embodiment, an entirely software embodiment or an embodiment containing both hardware and software elements. In one embodiment, the invention is implemented in software, which includes but is not limited to firmware, resident software, microcode, etc. FIG. 6 illustrates a computing system 500 in which a computer readable medium 506 may provide instructions for performing any of the methods disclosed herein.

Furthermore, the invention can take the form of a computer program product accessible from the computer readable medium 506 providing program code for use by or in connection with a computer or any instruction execution system. For the purposes of this description, the computer readable medium 506 can be any apparatus that can tangibly store the program for use by or in connection with the instruction execution system, apparatus, or device, including the computer system 500.

The medium 506 can be any tangible electronic, magnetic, optical, electromagnetic, infrared, or semiconductor system (or apparatus or device). Examples of a computer readable medium 506 include a semiconductor or solid state memory, magnetic tape, a removable computer diskette, a random access memory (RAM), a read-only memory (ROM), a rigid magnetic disk and an optical disk. Some examples of optical disks include compact disk-read only memory (CD-ROM), compact disk-read/write (CD-R/W) and DVD.

The computing system 500, suitable for storing and/or executing program code, can include one or more processors 502 coupled directly or indirectly to memory 508 through a system bus 510. The memory 508 can include local memory employed during actual execution of the program code, bulk storage, and cache memories which provide temporary storage of at least some program code in order to reduce the number of times code is retrieved from bulk storage during execution. Input/output or I/O devices 504 (including but not limited to keyboards, displays, pointing devices, etc.) can be coupled to the system either directly or through intervening I/O controllers. Network adapters may also be coupled to the system to enable the computing system 500 to become coupled to other data processing systems, such as through host systems interfaces 512, or remote printers or storage devices through intervening private or public networks. Modems, cable modem and Ethernet cards are just a few of the currently available types of network adapters.

What is claimed is:

1. A storage controller, comprising:
an interface operable to communicatively couple to a storage device;
a processor operable to select between hardware protocol detection of the storage device and firmware protocol detection of the storage device, to detect a protocol of the storage device when the storage device communicatively couples to the interface according to the selected protocol detection, and to select a protocol to process input/output requests from a host based on the detected protocol of the storage device; and
a hardware detector that is operable to perform the hardware protocol detection by measuring a time domain reflectometry signal.

2. The storage controller of claim 1, wherein:
the processor is further operable to perform a Serial Attached Small Computer System Interface protocol detection and a Peripheral Component Interconnect Express protocol detection at substantially the same time.

3. The storage controller claim 1, wherein:
the hardware detector is further operable to determine that the storage device is disconnected from the interface based on the time domain reflectometry signal.

4. The storage controller claim 1, wherein:
the processor is further operable to sample the time domain reflectometry signal, to determine a slope of the sampled time domain reflectometry signal, and to determine the protocol of the storage device based on the slope of the sampled time domain reflectometry signal.

5. The storage controller of claim 1, further comprising:
a plurality of protocol stacks, each protocol stack being operable to process the input/output requests according to a unique storage protocol.

6. The storage controller of claim 5, wherein:
the unique storage protocol is selected from a group consisting of: a Serial Attached Small Computer System Interface protocol; a Peripheral Component Interconnect Express protocol; a Serial AT Attachment protocol; a Fibre Channel over Internet Protocol protocol; an Enterprise Systems Connection; a Fibre Channel protocol; a Universal Serial Bus protocol; and an Internet Serial Attached Small Computer System Interface protocol.

7. The storage controller of claim 1, wherein:
the interface is further operable to communicatively couple to the storage device through an expander; and
the processor is further operable to detect the protocol of the storage device through the expander.

8. The storage controller of claim 1, wherein:
the processor is further operable to detect the protocol of the storage device by attempting to connect to the storage device with a last used protocol.

9. A method operable in a storage controller, the method comprising:
communicatively coupling the storage controller to a storage device;
selecting between hardware protocol detection of the storage device and firmware protocol detection of the storage device;
detecting a protocol of the storage device when the storage device communicatively couples to the interface according to the selected protocol detection;

selecting a protocol to process input/output requests from a host based on the detected protocol of the storage device; and measuring a time domain reflectometry signal to perform the hardware protocol detection.

10. The method of claim 9, further comprising:

performing a Serial Attached Small Computer System Interface protocol detection and a Peripheral Component Interconnect Express protocol detection at substantially the same time.

11. The method claim 9, further comprising:

determining that the storage device is disconnected from the interface based on the time domain reflectometry signal.

12. The method of claim 9, further comprising:

sampling the time domain reflectometry signal;

determining a slope of the sampled time domain reflectometry signal; and determining the protocol of the storage device based on the slope of the sampled time domain reflectometry signal.

13. The method of claim 9, further comprising:

processing the input/output requests according to a unique storage protocol from one of a plurality of protocol stacks.

14. The method of claim 13, wherein:

the unique storage protocol is selected from a group consisting of: a Serial Attached Small Computer System Interface protocol; a Peripheral Component Interconnect Express protocol; a Serial Attached AT Attachment protocol; a Fibre Channel over Internet Protocol protocol; an Enterprise Systems Connection; a Fibre Channel protocol; a Universal Serial Bus protocol; and a Serial Attached Small Computer System Interface protocol.

15. The method of claim 9, further comprising:

communicatively coupling to the storage device through an expander; and detecting the protocol of the storage device through the expander.

16. The method of claim 9, further comprising:

detecting the protocol of the storage device by attempting to connect to the storage device with a last used protocol.

17. A non-transitory computer readable medium comprising instructions that, when executed by a storage controller, direct the storage controller to:

communicatively couple the storage controller to a storage device;

select between hardware protocol detection of the storage device and firmware protocol detection of the storage device;

detect a protocol of the storage device when the storage device communicatively couples to the interface according to the selected protocol detection;

select a protocol to process input/output requests from a host based on the detected protocol of the storage device; and measure a time domain reflectometry signal to perform the hardware protocol detection.

18. The computer readable medium of claim 17, further comprising instructions that direct the storage controller to:

perform a Serial Attached Small Computer System Interface protocol detection and a Peripheral Component Interconnect Express protocol detection at substantially the same time.

19. The computer readable medium of claim 18, further comprising instructions that direct the storage controller to:

detect the protocol of the storage device by attempting to connect to the storage device with a last used protocol.

\* \* \* \* \*